United States Patent Office 2,722,231
Patented Nov. 1, 1955

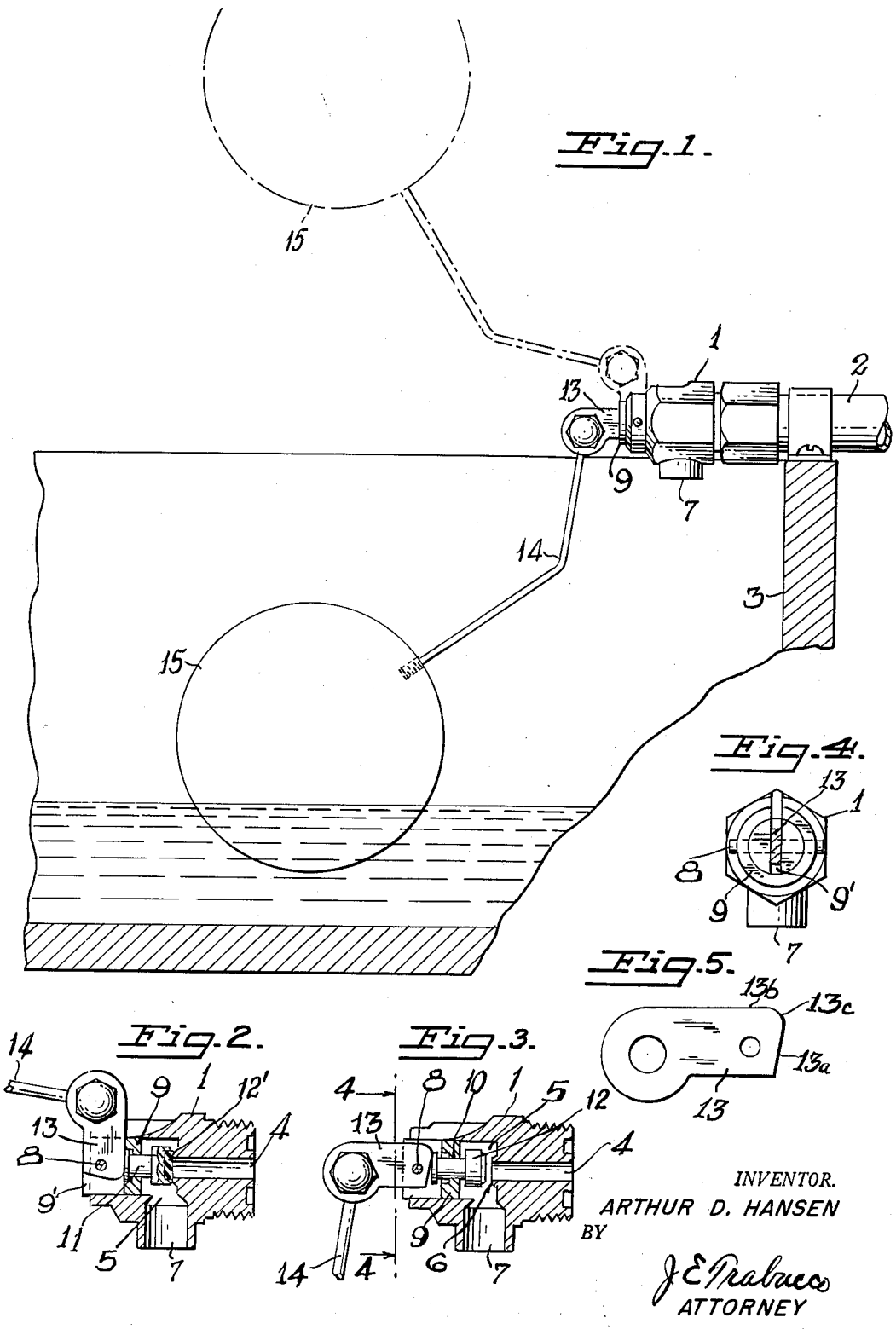

2,722,231

AUTOMATIC CONTROL VALVE

Arthur D. Hansen, Petaluma, Calif.

Application March 16, 1953, Serial No. 342,533

2 Claims. (Cl. 137—446)

This invention relates to an improved automatic valve for controlling the flow of water into a receptacle, and more particularly to an automatic float controlled valve used with a poultry watering trough to maintain a supply of water therein.

The present invention embodies a float controlled valve of the type adapted for use with poultry watering troughs to automatically allow the flow of water into the trough when the water therein drops to a predetermined level and to discontinue the flow of water into the trough when the water therein reaches a predetermined higher level. The float controlling the operation of the valve is adapted to be swung upwardly to an out-of-the-way position to permit access to the inside of the trough for cleaning purposes. When the float is in such an out-of-the-way position the flow of water into the trough is temporarily shut off, and the normal operation of the valve may be again resumed by manually swinging the float downwardly to its normal operating position.

The primary object of my invention is to provide a novel control valve for use with poultry watering receptacles, one which is adapted to be automatically closed and opened in accordance with the rise and fall of the water level in the receptacle.

Another object of my invention is to provide a control valve of the kind characterized wherein the float which controls the closing of the valve may be swung upwardly to an out-of-the-way position where it is releasably held by novel resilient means associated with the valve, thereby preventing the flow of water into the receptacle beneath and at the same time permitting access to the interior of the receptacle for cleaning purposes.

Other and further objects of my invention will be pointed out hereinafter, or will be indicated in the appended claims, or will be obvious to one skilled in the art upon an understanding of the present disclosure. For the purpose of this application, I have elected to show herein certain forms and details of a control valve of a type adapted for use with poultry watering troughs; it is to be understood, however, that the embodiment of my invention herein shown and described is for the purpose of illustration only and that therefore it is not to be regarded as exhaustive of the variations of the invention.

In the accompanying drawings:

Fig. 1 is a side elevation of a control valve embodying my invention, showing the valve mounted on the side of a poultry watering trough;

Fig. 2 is a vertical longitudinal sectional view taken centrally through the valve, and showing the valve element in a closed position;

Fig. 3 is a similar view showing the valve element in an open position;

Fig. 4 is a sectional view taken on the line 4—4 of Fig 3; and

Fig. 5 is an enlarged view of the valve actuating cam.

Referring to the drawing the numeral 1 designates a valve body or casing having a threaded end portion for the attachment of a conduit 2 connected to a source for supplying water to a watering trough or receptacle 3. The valve casing is provided with an axial water inlet opening 4 communicating at its intake end with the conduit 2 and with a chamber 5 at its outlet end. A circular valve seat 6 is provided on the valve body around the outlet end of the inlet opening 4. Water entering the chamber 5 is discharged into the watering trough 3 through an outlet opening 7 in the valve body.

Secured by a transverse pin 8 to the valve body 1 and positioned in an extension of the chamber 5 is a valve supporting member 9 which is formed with an axial opening 10 through which a valve stem 11 slidably extends. The axial opening 10 and the inlet opening 4 are in substantially horizontal alignment. The valve stem 11 has a valve element 12 secured to its inner end, the said valve element carrying a resilient tip portion 12' which is adapted to engage with the valve seat 6 when the valve element is in a closed position with respect to the inlet opening 4. The valve supporting member 9 is provided with a vertical end slot 9' at its outer end, and extending into the slot is a valve actuating cam 13 which is pivotally supported between its ends on the transverse pin 8. Suitably affixed to the outer end of the valve actuating cam 13 is a downwardly and outwardly extending rod 14 which has a ball type float 15 secured to its lower end. When the water level rises in the watering trough 3 the float 15 also rises, thereby turning the valve actuating cam 13 in a clockwise direction (Figs. 2 and 3), and when the water level recedes or falls the float drops and turns the cam in a counterclockwise direction. The inner end of the valve actuating cam 13 is so shaped that when its longitudinal axis is in a horizontal position (Fig. 3) the valve element 12 will be free to recede from the valve seat 6 and thereupon allow water to enter the chamber 5 from the inlet opening 4 and pass through the outlet opening 7 into the trough beneath. The particular shape of the inner end of the cam 13 is such that when the cam is pivotally moved in a clockwise direction by the float rising in the trough, the outer end of the valve stem 11 will be engaged by the cam and actuated inwardly until the resilient tip portion 12' of the valve element 12 seats against the valve seat 6, and discontinues the flow of water through the inlet opening 4. The shape of the cam 13 and the resiliency of the tip portion 12' of the valve element 12 also makes it possible for the float to be manually moved to a position shown by the broken lines in Fig. 1, and when the float is in such an upwardly disposed out-of-the-way position the valve element 12 is held by the cam in a position in which its resilient tip portion 12' engages with the valve seat 6 and prevents the flow of water through the valve when the valve element 12 is thus held by the cam 13 in a position in which its resilient tip portion 12' engages with the valve seat 6 and closes the opening 4, the said tip portion is compressed between the said cam and the seat. The resiliency of the tip portion 12' of the valve element 12 causes such tip portion to exert an outward pressure against the cam 13 when the longitudinal axis of the cam is in the vertical position shown in Fig. 2, thereby overcoming the force of gravity which would otherwise cause the float to swing downwardly to its normal operating position. As shown in the drawings the cam 13 when positioned with its longitudinal axis in a horizontal plane, as shown in Fig. 3, will allow the valve element 12 to recede from the valve seat 6 by the force of the water against it and allow water to flow through the valve. As shown in Figs. 3 and 5 the inner effective end of the cam 13 is inclined upwardly as at 13a, and where the horizontal upper surface 13b joins the inclined surface 13a there is an arcuate or curved surface 13c. The transverse pin 8 about which the cam 13 pivots is positioned concentrically with respect to the curved or arcuate surface 13c, and the closest point on the horizontal upper surface 13b is preferably positioned at a slightly less distance from the pin than the said curved surface, while the inclined surface 13a at its lower end is positioned closer to the pin than its upper end where it joins the said curved surface. The cam surfaces 13a and 13b extend along intersecting planes. The cam surfaces 13a, 13b and 13c of the cam 13 are so positioned with respect to the pin 8 that when the cam is positioned with its longitudinal axis lying in a horizontal plane the inclined cam surface 13a will not cause the valve element 12 to close the inlet opening 4; but when the cam is turned clockwise sufficiently by the rising float the arcuate cam surface 13c forces the valve element inwardly to bring about the seating of its resilient tip portion 12' against the valve seat 6, thereby discontinuing the flow of water through the valve; and finally, as the cam is manually turned clockwise by swinging the float to an out-of-the-way position as shown in Figs. 1 and 2, the surface 13b then assumes a vertical position and exerts an inward pressure on the valve element sufficient to maintain the tip portion thereof in the aforesaid seated position. When in an engaging position with the surface 13b of the cam the resilient tip portion 12' of the valve element is under sufficient compression to hold the cam 13 in the position shown in Fig. 2, thereby normally preventing the float from dropping downwardly into the trough.

What I claim is:

1. In a control valve, a valve casing having a chamber, a liquid inlet communicating with the chamber and a liquid outlet for discharging liquid from the chamber, the valve casing having an annular valve seat extending around the liquid inlet, a valve element mounted for reciprocating movement between a position closing the inlet and an open position, the valve element having a resilient tip portion at one end adapted to engage with the valve seat and close the inlet when the valve element is at one end of its reciprocating movement, a pivot member secured to the casing, a cam member pivotally mounted between its ends on the pivot member and having a cam surface engaging with the other end of the valve element, the cam surface having two connected cam surface portions extending along intersecting planes, one of such cam surface portions being closer to the pivot member than the other, the particular cam surface portion located closer to the pivot member being so positioned that when it engages with the valve element the valve element is in an open position and the other cam surface portion located farther from the pivot member being so positioned that when it engages with the valve element the valve element is held so the resilient tip portion engages with the valve seat and is under sufficient compression normally to hold the cam member against pivotal movement.

2. In a control valve, a valve casing having a chamber, a liquid inlet communicating with the chamber and a liquid outlet for discharging liquid from the chamber, the valve casing having an annular valve seat extending around the liquid inlet, a valve element mounted for reciprocating movement between a position closing the inlet and an open position, the valve element having a resilient tip portion at one end adapted to engage with the valve seat and close the inlet when the valve element is at one end of its reciprocating movement, a pivot member secured to the casing, a cam member pivotally mounted between its ends on the pivot member and having a cam surface at one end engaging with the other end of the valve element and a float connected to its other end, the cam surface having two connected cam portions extending along intersecting planes, one of such cam surface portions being closer to the pivot member than the other, the particular cam surface portion located closer to the pivot member being so positioned that when it engages with the valve element, the valve element is in an open position and the other cam surface portion located farther from the pivot member being so positioned that when it engages with the valve element the valve element is held so its resilient tip portion engages with the valve seat and is under sufficient compression normally to hold the cam member in its last mentioned position against the downward force exerted by the float.

References Cited in the file of this patent

UNITED STATES PATENTS

| | | |
|---|---|---|
| 901,571 | Watrous | Oct. 20, 1908 |
| 1,041,824 | Loser | Oct. 22, 1912 |
| 1,762,306 | Mueller | June 10, 1930 |
| 2,211,167 | Safford | Aug. 13, 1940 |
| 2,252,078 | Kohlmeyer | Aug. 12, 1941 |
| 2,543,205 | Shoffner | Feb. 27, 1951 |

FOREIGN PATENTS

| | | |
|---|---|---|
| 6,868 | Great Britain | 1912 |